(12) United States Patent
Blum et al.

(10) Patent No.: US 6,811,665 B2
(45) Date of Patent: Nov. 2, 2004

(54) PROCESS FOR THE APPLICATION OF A PROTECTIVE AND DECORATIVE LAMINAR STRUCTURE

(75) Inventors: Joachim Blum, Remscheid (DE); Klausjörg Klein, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/463,681

(22) PCT Filed: Jul. 23, 1998

(86) PCT No.: PCT/EP98/04614

§ 371 (c)(1),
(2), (4) Date: Jan. 31, 2000

(87) PCT Pub. No.: WO99/06158

PCT Pub. Date: Feb. 11, 1999

(65) Prior Publication Data

US 2002/0011412 A1 Jan. 31, 2002

(30) Foreign Application Priority Data

Aug. 1, 1997 (DE) .......................................... 197 33 312

(51) Int. Cl.⁷ ............................................. C25D 13/04
(52) U.S. Cl. ...................... 204/486; 204/487; 204/488
(58) Field of Search ................................ 204/486–488, 204/484

(56) References Cited

U.S. PATENT DOCUMENTS

| | | | | | |
|---|---|---|---|---|---|
| 3,674,671 A | * | 7/1972 | Stromberg | ................. | 204/484 |
| 4,626,559 A | * | 12/1986 | Sadler et al. | ................ | 523/122 |
| 4,983,454 A | * | 1/1991 | Hiraki et al. | ................ | 204/486 |
| 5,190,830 A | * | 3/1993 | Matsuo et al. | .............. | 204/486 |
| 5,203,975 A |   | 4/1993 | Richardson | .............. | 204/181.1 |
| 5,624,978 A | * | 4/1997 | Soltwedel et al. | .......... | 523/402 |
| 5,804,610 A | * | 9/1998 | Hamer et al. | ................ | 522/182 |

FOREIGN PATENT DOCUMENTS

| | | |
|---|---|---|
| DE | 195 19 665 C1 | 5/1995 |
| DE | 044 24 299 A1 | 1/1996 |
| DE | 196 33 173 C1 | 8/1996 |
| DE | 195 17 068 A1 | 11/1996 |
| DE | 197 16 234 A1 | 4/1998 |
| JP | 02300281 A * | 12/1990 |
| JP | 023000281 A * | 12/1990 |
| WO | WO 90/01051 * | 2/1990 |
| WO | WO96.38234 | 12/1996 |

OTHER PUBLICATIONS

Merriam–Wbster's Collegiate Dictionary, 10th edition, in the definition of the term "plastic" in p. 891, 1999.*

* cited by examiner

Primary Examiner—Kishor Mayekar
(74) Attorney, Agent, or Firm—Pillsbury Winthrop LLP

(57) ABSTRACT

Process for the production of a three-dimensional substrate provided with a protective and decorative laminar structure, in which a primer layer of a coating composition (I) which is electrically conductive in the stoved state is applied without spraying onto an electrically conductive substrate and stoved, whereupon a substrate not yet in the desired three-dimensional shape is shaped, whereupon a second coating layer of an electrophoretically depositable coating composition (II) is electrophoretically deposited and stoved and whereupon a plastic film is applied.

13 Claims, No Drawings

PROCESS FOR THE APPLICATION OF A PROTECTIVE AND DECORATIVE LAMINAR STRUCTURE

FIELD OF THE INVENTION

This invention relates to a process for providing the surface of electrically conductive three-dimensional substrates with a protective and decorative laminar structure and to the resultant laminar structures.

BACKGROUND OF THE INVENTION

Modern automotive original lacquer coatings usually consist of a base coat/clear topcoat lacquer coating, which is applied onto a body which has been electrophoretically primed and coated with surfacer. In such coatings, the surfacer, base coat lacquer and clear lacquer are applied by spraying. Large quantities of problematic lacquer sludge are formed during the spray application in the lacquer coating process. The lacquer coating process demands elaborate logistics on the part of the vehicle manufacturer due not only to the multiple lacquer layers of different lacquer materials to be applied but also to the numerous shades in which some of the lacquer layers are produced. The base lacquer layers are thus applied in various different shades, as are the surfacer layers too by many automotive manufacturers.

In the Federal Republic of Germany, for example, vehicles marked as taxis are of a prescribed shade. Vehicles which have been used as taxis are difficult to sell as they can be recognised as former taxis. For this reason, conventional cars not painted in the taxi shade have been provided with a bonded plastic film of the taxi shade which hides the actual shade of the multi-layer lacquer coating. This film may subsequently be removed once the taxi has completed its service, so revealing the actual lacquer coating again.

SUMMARY OF THE INVENTION

The object of the invention is to provide a logistically straightforward process which avoids lacquer waste and permits the surface of three-dimensional substrates, in particular motor vehicles, to be provided with a protective coating and decorative finish. In particular, it should be possible to perform the process in an environmentally friendly and efficient manner.

It has been found that this object may be achieved by a process for the production of a three-dimensional substrate provided with a protective and decorative laminar structure, which process is characterised in that a primer layer of a coating composition (I) which is electrically conductive in the stoved state is applied without spraying onto an electrically conductive substrate and stoved, whereupon a substrate not yet in the desired three-dimensional shape is shaped, whereupon a second coating layer of an electrophoretically depositable coating composition (II) is electrophoretically deposited and stoved and whereupon a plastic film is applied.

In the process according to the invention, the conductive primer layer is in particular applied by brushing, roller application, dipping or flow coating. The conductive primer layer is particularly preferably applied using the coil coating process, by autophoretic deposition or electrophoretic deposition. The conductive primer layer may be applied onto the entire surface, i.e. both sides, of the substrate. The substrate may be in the desired three-dimensional shape even before application of the primer layer. It is also possible not to shape the substrate three-dimensionally until the conductive primer layer has been applied and stoved, wherein it has optionally previously been stamped or cut. Shaping may be achieved by the usual processes familiar to the person skilled in the art for the particular substrate, for example by deep drawing. The substrate may also be in the form of individual components which may be combined into an assembly before application of the second coating layer, wherein the individual components may already have been provided with the primer layer.

Various coating compositions (I) may be used to apply the coating layer which is electrically conductive in the stoved state, wherein no spray application methods are used according to the invention.

A first preferred embodiment of the present invention comprises a process for the production of a protective and decorative laminar structure on a three-dimensional, electrically conductive substrate, in which a primer layer of a primer coating composition (Ia) which is electrically conductive in the stoved state is applied onto both sides of a sheet metal coil using the coil coating process and stoved, sheet metal components are subsequently stamped out from the coil and shaped by deep drawing and optionally joined together into an assembly, whereupon a second coating layer of an electrophoretically depositable coating composition (II) is electrophoretically deposited and stoved and whereupon a plastic film is subsequently applied.

A second preferred embodiment of the present invention comprises a process for the production of a protective and decorative laminar structure on a three-dimensional, electrically conductive substrate having an autophoretically coatable surface, in which a primer layer of an electrophoretically depositable coating composition (Ib) which is electrically conductive in the stoved state is autophoretically deposited and stoved, whereupon a further coating layer of an electrophoretically depositable coating composition (II) is electrophoretically deposited and stoved and whereupon a plastic film is subsequently applied.

A third and particularly preferred embodiment of the present invention comprises a process for the production of a protective and decorative laminar structure on a three-dimensional, electrically conductive substrate, in which a primer layer of an electrophoretically depositable coating composition (Ic) which is electrically conductive in the stoved state is electrophoretically deposited and stoved, whereupon a further coating layer of an electrophoretically depositable coating composition (II) other than (Ic) is electrophoretically deposited and stoved and whereupon a plastic film is subsequently applied.

DETAILED DESCRIPTION OF THE PREFERRED EMBODIMENTS

In the first preferred embodiment of the process according to the invention, a primer layer of a primer coating composition (Ia) is produced of such a film thickness that an electrically conductive coating layer is obtained in the stoved state. After stamping and shaping of the sheet metal components primed in this manner and optionally joined together into an assembly, in particular an automotive body, the second layer may then be applied by electrophoretic deposition from an electrophoretically depositable aqueous coating composition (II).

The primer coating compositions (Ia) in particular comprise liquid coating compositions which may be applied by the coil coating process. The coating compositions may be aqueous or based on organic solvents. They may be physically drying. They are generally crosslinkable by the formation of covalent bonds. The coating compositions may be self-crosslinking or extrinsically crosslinking systems.

The primer coating compositions (Ia) usable for the production of the primer layer in the process according to the invention contain one or more film-forming binders. They may optionally also contain crosslinking agents, in particular in the event that the binders are not self-crosslinking or are physically drying or thermoplastic. No particular restrictions apply to either the binder component or the crosslinking agent component; resins conventional in lacquers and familiar to the person skilled in the art may be used. Polyester, polyurethane, epoxy and/or polymer resins may, for example, be used as the film-forming binders.

Selection of the optionally present crosslinking agent is determined by the functionality of the binders, i.e. the crosslinking agents are selected from among conventional crosslinking agents familiar to the person skilled in the art in such a manner that they have a reactive functionality complementary to the functionality of the binder. Examples of such complementary functionalities between binders and crosslinking agents are:
hydroxyl/methylol ether, hydroxyl/blocked isocyanate.

Providing that they are mutually compatible, two or more such complementary functionalities may simultaneously be present. The crosslinking agents optionally used in the primer coating compositions (Ia) may be present individually or as a mixture.

It is preferred in the process according to the invention for the primer coating compositions (Ia) applied in the coil coating process to contain constituents which confer electrical conductivity and impart to the primer layer in the stoved state a sufficiently low specific resistance, generally of below $10^8$ Ωcm, for example between $10^3$ and $10^8$ Ωcm, for the electrophoretic deposition of a further coating layer of an electrophoretically depositable coating composition (II). This also ensures that the primer coating layer is spot-weldable. Examples of such components which confer electrical conductivity are particulate electrical conductors or semi-conductors, as are conventional for this purpose and familiar to the person skilled in the art, for example iron oxide black, graphite, conductive carbon black, metal powders, for example of aluminium, zinc, copper or stainless steel, molybdenum disulfide, special conductive pigments based on mica flakes, for example mica flakes coated with antimony-doped tin dioxide. The constituents which impart electrical conductivity are present in the primer coating composition (Ia) in a quantity such that the desired specific resistance of the primer coating layer in the stoved state is achieved. Relative to the solids content of the primer coating composition (Ia), the proportion of the constituent or constituents which impart(s) electrical conductivity is, for example, between 1 and 30 wt. %. The proportion may readily be determined by the person skilled in the art; it is dependent, for example, on the specific weight, specific electrical conductivity and particle size of the constituents used to impart electrical conductivity. One or more of these constituents may be present in combination.

The primer coating compositions (Ia) may contain pigments and/or extenders. Pigments or extenders which may be considered are, for example, conventional inorganic or organic pigments and/or extenders. Examples are carbon black, titanium dioxide, iron oxide pigments, kaolin, talcum, silicon dioxide and in particular anti-corrosion pigments, such as zinc chromate, strontium chromate, lead silicate, zinc phosphate, aluminium phosphate, strontium aluminium polyphosphate hydrate.

The primer coating compositions (Ia) may furthermore contain conventional additives. Examples of these are conventional lacquer additives, such as wetting agents, dispersion auxiliaries, emulsifiers, levelling agents, corrosion inhibitors, anti-foaming agents and in particular lubricants, for example waxes such as polyethylene wax, molybdenum disulfide, graphite.

Primer coating compositions (Ia) suitable for the production of primer layers, applicable using the coil coating process and containing no special or adequate quantities of constituents which impart electrical conductivity, are those, from which primer layers may be produced while retaining a low dry film layer thickness of for example 1 to 3 μm, which exhibit sufficient electrical conductivity in the stoved state for deposition of a subsequent coating layer of an electrophoretically depositable coating composition (II) and, preferably, also spot-weldability.

The primer coating compositions (Ia) preferably usable for the production of primer layers, applicable using the coil coating process and which may be applied in greater dry film thicknesses of for example 2 to 15 μm, preferably of 3 to 10 μm by virtue of their content of constituents conferring electrical conductivity, are those coating compositions from which primer layers may be produced which exhibit a sufficiently low specific electrical resistance for the deposition of a subsequent coating layer of an electrophoretically depositable coating composition (II) and which are preferably spot-weldable.

Substrates used for the first embodiment of the process according to the invention are metal sheets wound into coils, for example having a sheet thickness typical for bodywork construction of 0.7 to 1.3 mm, for example made from iron, zinc, aluminium or corresponding alloys. Galvanised sheet metal, for example galvanised sheet steel is preferred. The metal surfaces may be pretreated, for example by phosphating, and optionally be provided with passivation.

In the coil coating process, the primer coating composition (Ia) is rolled onto both sides of the sheet metal substrate. If the primer coating composition (Ia) is one which contains no special constituents which confer electrical conductivity, it is applied in a sufficiently low dry film thickness to ensure sufficient electrical conductivity for electrophoretic deposition of a further coating layer of an electrophoretically depositable coating composition (II), i.e. of a dry film thickness which is not yet electrically insulating, for example in a dry film thickness of 1 to 3 μm. If, in contrast, it is a primer coating composition (Ia) preferred in the process according to the invention which contains constituents conferring electrical conductivity which impart a sufficiently low specific resistance to the first coating layer in the stoved state for electrophoretic deposition of a further coating layer of an electrophoretically depositable coating composition (II), the primer coating composition (Ia) is applied in a dry film thickness of, for example, 2 to 15 μm, preferably of 3 to 10 μm. Stoving of the primer coating layer proceeds rapidly, for example within 30 to 60 seconds, at elevated temperature, for example at 300 to 370° C., wherein maximum object temperatures (PMT, peak metal temperatures) of, for example, between 200 and 260° C. are achieved, which stoving may proceed, for example, in a convection oven.

Sheet metal components of the desired shape are conventionally stamped and then shaped, for example by deep drawing, from the metal coil provided on both sides with the stoved primer layer. The shaped components may then, optionally with components made from other materials, be joined together into an assembly, in particular a vehicle body, for example by adhesive bonding and/or clinching and/or bolting and/or preferably welding, for example spot welding. The components made from other materials may, for example, be differently coated or uncoated metals or plastics, preferred components being those having a conductive and electrophoretically coatable surface.

In the second preferred embodiment of the process according to the invention, a primer layer of an autophoretically depositable coating composition (Ib) is autophoretically deposited and stoved, wherein in the stoved state an electrically conductive coating layer is obtained. The second layer may then be applied by electrophoretic deposition from an electrophoretically depositable aqueous coating composition (II).

Autophoretically depositable coating compositions (Ib) which are known per se may be used as the autophoretically coating compositions (Ib), wherein these compositions contain constituents which impart to the primer layer in the stoved state a sufficiently low specific resistance for electrophoretic deposition of a further coating composition of an electrophoretically depositable coating composition (II).

The autophoretically depositable coating compositions (Ib) are coating compositions based on aqueous binder dispersions having a negative surface charge of the binder particles. By virtue of their generally acidic pH value of for example between 1 and 6, preferably between 1.5 and 5.0, and their generally oxidising nature, autophoretic lacquers are capable of attacking sufficiently non-noble metal surfaces, so liberating the corresponding metal ions. If this results in the formation of a concentration of metal ions in the vicinity of the metal surface which is sufficient to destabilise and coagulate the binder particles dispersed in the aqueous phase, then a coating film is deposited on the metal surface.

The autophoretically depositable coating compositions (Ib) generally have a low solids content of, for example, up to 20 wt. %, wherein the lower limit is generally, for example, 5 wt. %, and the upper limit for example 10 wt. %. In addition to the autophoretically depositable film-forming binder, the compositions contain water, acid and electrically conductive constituents, as well as in general oxidising agents, optionally together with crosslinking agents for the binder, extenders, pigments and conventional lacquer additives.

The autophoretically depositable coating compositions (Ib) may be physically drying or crosslinkable with the formation of covalent bonds. The autophoretic lacquers (Ib) which crosslink with the formation of covalent bonds may be self-crosslinking or extrinsically crosslinking systems.

The autophoretic lacquers (Ib) usable for the production of the primer layer in the process according to the invention contain one or more film-forming binders containing per se neutral or anionic groups. In particular in the event that the binders are not self-crosslinking or are physically drying or thermoplastic, the lacquers may optionally also contain crosslinking agents. Binders and optionally present crosslinking agents are in the form of an aqueous dispersion having a negative surface charge of the particles. The negative surface charge stabilises the dispersed particles in the aqueous phase. The negative surface charge may, for example, originate from anionic groups in the binder and/or in particular in the case of per se neutral binders, from an anionic emulsifier for the binder and the crosslinking agents. Examples of anionic groups in the binder are anionic groups of the binder per se, for example carboxyl groups or sulfonate groups, and/or anionic residues from production of the binder, for example from the production of a per se neutral binder. Examples of anionic residues from production of the binder are sulfate groups as residues remaining in the binder from a free-radical polymerisation initiated by peroxydisulfate. No restrictions apply to either the binder component or to the crosslinking agent component; resins conventional in lacquers and familiar to the person skilled in the art may be used. Polyester, polyurethane, epoxy and/or polymer resins may, for example, be used as the film-forming binder. Polymer resins, i.e. binders produced by free-radical polymerisation, in particular by emulsion polymerisation or seed polymerisation, are particularly preferred. Conventional aqueous, thermoplastic polymer dispersions (lattices) which contain homo- or copolymers of olefinically unsaturated monomers having glass transition temperatures of for example between 0 and 100° C. as the disperse phase are particularly preferred. Examples of suitable olefinically unsaturated monomers for the synthesis of such homo- and copolymers are (meth)acrylic acid esters, such as for example methyl (meth)acrylate, ethyl (meth)acrylate, n-butyl (meth)acrylate, hydroxyethyl (meth)acrylate, hydroxypropyl (meth)acrylate, ethylhexyl (meth)acrylate; glycidyl esters of unsaturated carboxylic acids, such as for example glycidyl (meth)acrylate; (meth)acrylamide, (meth)acrylonitrile, monomers containing anionic groups, such as alkali metal, for example sodium, 2-sulfoethylmethacrylate, (meth)acrylic acid; as well as monomers having no further functional groups or other functional groups, such as for example ethylene, styrene, vinyl chloride, vinylidene chloride, vinyl acetate, butadiene. Examples of aqueous polymer dispersions suitable for the purposes of the invention are styrene/butadiene, butadiene/acrylonitrile, vinyl chloride, ethylene/vinyl acetate and vinylidene chloride copolymer dispersions.

(Meth)acrylic here denotes acrylic and/or methacrylic.

Selection of the optionally present crosslinking agent is determined by the functionality of the binders, i.e. the crosslinking agents are selected from among conventional crosslinking agents familiar to the person skilled in the art in such a manner that they have a reactive functionality complementary to the functionality of the binders. Examples of such complementary functionalities between binders and crosslinking agents are:

hydroxyl/methylol ether, hydroxyl/blocked isocyanate.

Providing that they are mutually compatible, two or more such complementary functionalities may simultaneously be present in an autophoretic lacquer (Ib). The crosslinking agents optionally used in the autophoretic lacquers (Ib) may be present individually or as a mixture.

The autophoretically depositable coating compositions (Ib) contain one or more free acids in a quantity to establish the above-stated pH range and preferably also one or more oxidising agents. Examples of preferred acids are inorganic acids, such as hydrochloric acid, phosphoric acid, sulfuric acid, nitric acid, and organic acids, such as formic acid, acetic acid. Hydrofluoric acid is particularly preferred. Examples of preferred oxidising agents are chromate, dichromate, bromate, chlorate, perchlorate, permanganate, persulfate, peroxydisulfate. Hydrogen peroxide is particularly preferred.

A particularly preferred combination of acid and oxidising agent is the combination hydrofluoric acid/hydrogen peroxide.

The autophoretically depositable coating compositions (Ib) contain constituents which confer electrical conductivity. They are intended to impart to the primer layer in the stoved state a sufficiently low specific resistance, generally of below $10^8$ Ωcm, for example between $10^3$ and $10^8$ Ωcm, for the electrophoretic deposition of a further coating layer of an electrophoretically depositable coating composition (II). Examples of such components are particulate electrical conductors or semi-conductors, as are conventional for this purpose and familiar to the person skilled in the art, for example iron oxide black, graphite, conductive carbon black, metal powders, for example of copper or stainless steel, molybdenum disulfide, special conductive pigments based on mica flakes, for example mica flakes coated with antimony-doped tin dioxide. The constituents which impart electrical conductivity are present in the autophoretically depositable coating composition (Ib) in a quantity such that the desired specific resistance of the coating layer deposited therefrom is achieved in the stoved state. Relative to the solids content of the autophoretically deposited coating composition (Ib), the proportion of the constituent or constituents which impart(s) electrical conductivity is, for example, between 1 and 30 wt. %. The proportion may readily be determined by the person skilled in the art; it is dependent, for example, on the specific weight, specific electrical conductivity and particle size of the constituents used to impart electrical conductivity. One or more of these constituents may be present in combination.

The autophoretically depositable coating compositions (Ib) may contain pigments and/or extenders. Pigments which may be considered are, for example, conventional inorganic or organic pigments, in particular acid-resistant pigments and/or extenders. Examples are carbon black, titanium dioxide, iron oxide pigments, kaolin, talcum or silicon dioxide as well as anti-corrosion pigments, Pigments, extenders and constituents conferring electrical conductivity to the stoved autophoretic lacquer (Ib) may, for example, be used in formulating the autophoretic lacquer (Ib) as pigment suspensions (pigment slurries) or ground pigment preparations in water and/or organic, water-miscible solvents, such as glycols, for example ethylene glycol, propylene glycol; alcohols, for example sec.-butanol and hexanol; glycol ethers, for example ethoxy-propanol, methoxypropanol and butoxyethanol. Such ground pigment preparations are commercially available and are offered for sale, for example, by the company Hoechst under the name Colanyl®.

The autophoretically depositable coating compositions (Ib) usable in the process according to the invention may furthermore contain conventional additives. Examples of these are conventional lacquer additives, such as wetting agents, anionic and/or nonionic emulsifiers, protective colloids, levelling agents, corrosion inhibitors, plasticisers, anti-foaming agents, solvents for example as film-forming auxiliaries, light stabilisers, fluorides, in particular for example iron trifluoride, hydrogen fluorides, complex fluorine anions, for example tetrafluoroborates, hexafluorozirconates, hexafluorotitanates.

Substrates for the second preferred embodiment of the process according to the invention are electrically conductive, autophoretically coatable metal surfaces, in particular metal assemblies, preferably unfinished vehicle bodies having metallic surfaces. These may have been manufactured from a single metal or constructed using composite methods from two or more metallic materials and/or from plastic components provided with a suitable metal layer. Metallic surfaces which may be considered are conventional metal surfaces familiar to the person skilled in the art, for example of iron, zinc, aluminium or corresponding alloys, as well as, for example, galvanised steel surfaces, which may be attacked by autophoretic lacquer systems, in particular at an acidic pH of for example between 1 and 6 with the liberation of metal ions. The metal surfaces may be pretreated, for example by phosphating, and optionally be provided with passivation. It should be noted in this connection that the phrase "unfinished vehicle bodies" in particular includes not only unfinished motor vehicle bodies but also, for example, the components thereof and motor vehicle chassis having visible surfaces.

The primer layer of an autophoretically depositable coating composition (Ib) is deposited autophoretically in the conventional manner onto these substrates, preferably using the dipping process, preferably in a dry film thickness of, for example, 5 to 25 $\mu$m, particularly preferably of 10 to 20 $\mu$m. Before subsequent coating with the electrophoretically depositable coating composition (II), the autophoretically deposited coating layer may be post-treated with water and/or optionally with special solutions, for example rinsed, before stoving. (In connection with the application of the autophoretically depositable coating composition, depending upon the nature of the autophoretic lacquer system, the term "stoving" may mean stoving with chemical crosslinking of the autophoretically deposited coating layer or a purely physical drying at elevated temperature, for example with fusion or sintering and formation of a continuous autophoretic lacquer coating). Stoving proceeds at the temperatures adapted to the autophoretic lacquer system used of, for example, between 80 and 190° C., preferably between 100 and 160° C.

In the third, particularly preferred embodiment of the process according to the invention, a primer layer of an electrophoretically depositable coating composition (Ic) is electrophoretically deposited and stoved, wherein an electrically conductive coating layer is obtained in the stoved state. The second layer may then be applied by electrophoretic deposition of an electrophoretically depositable aqueous coating composition (II) other than (IC).

Electrophoretically depositable coating compositions (Ic) which may be used are per se known anodically or cathodically depositable electrocoating lacquers, wherein it is the case that the electrophoretically depositable coating composition (Ic) contains constituents which impart a sufficiently low specific resistance to the primer layer in the stoved state for the electrophoretic deposition of a further electrophoretically depositable coating composition (II) other than (Ic).

The electrophoretically depositable coating compositions (Ic) are aqueous coating compositions having a solids content of up to 50 wt. %, for example of up to 20 wt. %, wherein the lower limit is, for example, around 10 wt. %. The solids content is formed from binders conventional for electrocoating, wherein at least a proportion of the binder bears ionic substituents and/or substituents convertible into ionic groups, optionally together with groups capable of chemical crosslinking, together with optionally present crosslinking agents, electrically conductive constituents, extenders, pigments and conventional lacquer additives.

The ionic groups or groups convertible into ionic groups of the binders may be anionic groups or groups convertible into anionic groups, for example acid groups, such as —COOH, —SO$_3$H and/or —PO$_3$H$_2$ and the corresponding anionic groups neutralised with bases. They may also be cationic groups or groups convertible into cationic groups, for example basic groups, preferably basic groups containing nitrogen; these groups may be in quaternised form or they are converted into ionic groups with a conventional neutralising agent, for example an organic monocarboxylic acid, such as for example formic acid or acetic acid. Examples are amino, ammonium, for example quaternary ammonium, phosphonium and/or sulfonium groups.

Anodically depositable electrocoating binders and lacquers containing the conventional anionic groups may, for example, be used. These are, for example, binders based on polyesters, epoxy resin esters, (meth)acrylic copolymer resins, maleate oils or polybutadiene oils having a weight average molecular weight (Mw) of, for example, 300–10000 and an acid value of, for example, 35–300 mg of KOH/g. The binders bear, for example, —COOH, —$SO_3H$ and/or —$PO_3H_2$ groups. Once at least a proportion of the acid groups has been neutralised, the resins may be converted into the aqueous phase. The binders may be self-crosslinking or extrinsically crosslinking. The lacquers may thus also contain conventional crosslinking agents, for example triazine resins, crosslinking agents which contain transesterifiable groups or blocked polyisocyanates.

Conventional cathodic electrocoating lacquers based on cationic or basic binders are also usable for the production of the primer layer. Such basic resins are, for example, resins containing primary, secondary and/or tertiary amino groups, the amine values of which are, for example, from 20 to 250 mg of KOH/g. The weight average molecular weight (Mw) of the base resins is preferably 300 to 10000. Examples of such base resins are amino(meth)acrylate reins, aminoepoxy reins, aminoepoxy resins having terminal double bonds, aminoepoxy resins having primary OH groups, aminopolyurethane resins, polybutadiene resins containing amino groups or modified epoxy resin/carbon dioxide/amine reaction products. These base resins may be self-crosslinking or they are used mixed with known crosslinking agents. Examples of such crosslinking agents are amino resins, blocked polyisocyanates, crosslinking agents having terminal double bonds, polyepoxy compounds or crosslinking agents which contain transesterifiable groups.

The electrocoating lacquer composition (Ic) contains constituents which confer electrical conductivity. They are intended to impart to the primer layer in the stoved state a sufficiently low specific resistance, generally of below $10^8$ $\Omega$cm, for example between $10^3$ and $10^8$ $\Omega$cm, for the electrophoretic deposition of a further coating layer of the electrophoretically depositable coating composition (II). Examples of such components are particulate electrical conductors or semi-conductors, such as for example iron oxide black, graphite, conductive carbon black, metal powders, for example of aluminium, copper or stainless steel, molybdenum disulfide, special conductive pigments based on mica flakes, for example mica flakes coated with antimony-doped tin dioxide, or also polymers exhibiting electrical conductivity, such as for example preferably polyaniline. The constituents which impart electrical conductivity are present in the electrocoating lacquer composition (Ic) in a quantity such that the desired specific resistance of the coating layer deposited therefrom is achieved in the stoved state. Relative to the solids content of the autophoretically deposited coating composition (Ic), the proportion of the constituent or constituents which impart(s) electrical conductivity is, for example, between 1 and 30 wt. %. The proportion may readily be determined by the person skilled in the art; it is dependent, for example, on the specific weight, specific electrical conductivity and particle size of the constituents used to impart electrical conductivity. One or more of these constituents may be present in combination.

In addition to the base resins and optionally present crosslinking agent and the constituents present in the electrocoating lacquer composition (Ic) which impart electrical conductivity to the primer layer in the stoved state, the electrocoating lacquer composition (Ic) may contain pigments, extenders and/or conventional lacquer additives. Pigments which may be considered are, for example, conventional inorganic and/or organic colouring pigments, such as for example titanium dioxide, iron oxide pigments, carbon black, phthalocyanine pigments, quinacridone pigments. Examples of extenders are kaolin, talcum or silicon dioxide.

The pigments may be dispersed to yield pigment pastes, for example using known paste resins.

Possible additives are the conventional additives as are in particular known for electrocoating lacquer compositions. Examples of these are wetting agents, neutralising agents, levelling agents, catalysts, corrosion inhibitors, anti-foaming agents, solvents.

It is preferred in the process according to the invention to use a cathodic electrocoating lacquer composition as the electrocoating lacquer composition (Ic).

Suitable substrates for the third, particularly preferred embodiment of the process according to the invention are electrically conductive, electrophoretically coatable assemblies, for example metal assemblies. Automotive bodies or components thereof are in particular suitable; they may consist of pretreated or unpretreated metal or plastic which is electrically conductive or provided with an electrically conductive layer.

The first coating layer of the electrophoretically depositable coating composition (Ic) is deposited electrophoretically in the conventional manner onto these substrates in a dry film thickness of, for example, 5 to 15 µm and stoved at temperatures of, for example, between 130 and 180° C.

The stoved primer layer obtained in the first preferred embodiment of the process according to the invention using coating composition (Ia) or in the second preferred embodiment of the process according to the invention using coating composition (Ib) or in the third, particularly preferred embodiment of the process according to the invention using coating composition (Ic) covers the entire surface of the substrate.

The resultant substrate, preferably an automotive body, provided with an electrically conductive, stoved primer layer having a specific resistance of in particular below $10^8$, for example of between $10^3$ and $10^8$ $\Omega$cm is provided with the second coating layer by electrocoating of an electrophoretically depositable coating composition (II) other than the electrophoretically depositable coating composition (Ic) and stoved. The plastic film may subsequently be applied according to the invention.

The second coating layer may or may not influence the decorative impression of a laminar structure produced according to the invention, the second coating layer preferably does have an influence on the decorative effect. In this case, the electrophoretically depositable coating compositions (II) are in particular colouring and/or effect coating compositions.

In the process according to the invention, the second coating layer may be produced using per se known anodically or cathodically depositable electrocoating lacquers as the electrocoating lacquer compositions (II) other than the electrocoating lacquer compositions (Ic).

The electrocoating lacquer compositions (II) are in particular aqueous coating compositions having a solids content of up to 50 wt. %, for example of up to 20 wt. %, wherein the lower limit is, for example, around 10 wt. %. The solids content is formed from binders conventional for electrocoating, wherein at least a proportion of the binder bears ionic substituents and/or substituents convertible into ionic groups, optionally together with groups capable of chemical crosslinking, together with optionally present crosslinking agents, extenders, pigments or additives conventional in lacquers.

With regard to the ionic groups, the binders, and the optionally present crosslinking agents, the statements made above in connection with the electrocoating lacquer compositions (Ic) apply.

An anodic electrocoating lacquer composition is preferably used as the electrocoating lacquer composition (II).

In addition to the base resins and optionally present crosslinking agent, the electrocoating lacquer compositions (II) may contain colouring and/or effect pigments, extenders and/or additives conventional in lacquers. In particular, they contain colouring and/or effect pigments, preferably only colouring absorption pigments, if the second coating layer has an influence on the decorative effect of a laminar structure produced according to the invention. Pigments which may be considered are, for example, conventional inorganic and/or organic coloured pigments and/or effect pigments, such as titanium dioxide, iron oxide pigments, carbon black, phthalocyanine pigments, quinacridone pigments, metal pigments, for example made from titanium, aluminium or copper, interference pigments, such as for example aluminium coated with titanium dioxide, coated mica, graphite effect pigments, lamellar iron oxide or lamellar copper phthalocyanine pigments. Examples of extenders are kaolin, talcum or silicon dioxide.

The pigments may be dispersed to yield pigment pastes, for example using known paste resins. Especially in the case of anodic electrocoating lacquer compositions (II), it is possible to use those pigment pastes as are used in the sprayable aqueous base lacquers familiar to the person skilled in the art for the production of two-layer lacquer coatings of the base lacquer/clear lacquer type.

Conventional additives, as are in particular known for electrocoating lacquer compositions, are possible additives. Examples of these are wetting agents, neutralising agents, levelling agents, catalysts, corrosion inhibitors, anti-foaming agents, solvents, light stabilisers optionally in combination with anti-oxidants.

The second coating layer is preferably applied in a dry film thickness of, for example, 10 to 50 µm, particularly preferably of between 15 and 40 µm, and stoved at elevated temperatures, for example between 130 and 180° C. The second coating layer generally has virtually no electrical conductivity, i.e. in the stoved state it exhibits a specific resistance of in general above $10^9$ Ωcm.

The second coating may, but need not, extend over the entire area of the three-dimensional substrate. It is accordingly possible, for example, especially in the second and third embodiments of the process according to the invention, to provide a first coating over the entire area by applying a primer coat of the primer coating composition (Ib) or (Ic) and to provide a second coating of the electrocoating lacquer composition (II) substantially only on the external areas, in particular on the visible surfaces of the substrate to be provided with the laminar structure, i.e. for example not in confined cavities of a vehicle body. Once the second coating layer deposited from the electrocoating lacquer composition (II) has been stoved, the plastic film is applied. This is preferably performed only on external areas, in particular on the visible surfaces of a three-dimensional substrate, for example preferably on the external visible surfaces of an automotive body.

The plastic films applied in the process according to the invention in particular comprise those made from thermoplastics or composite films of two or more plies of one or more different thermoplastics. Examples of suitable thermoplastics are polyolefin plastics, polyamide, polyvinyl chloride. Plastic films made from polyvinyl chloride are preferred. The plastic films generally have a thickness of 20 to 200, preferably of 40 to 100 µm and they determine, either alone or in conjunction with the underlying lacquer layer produced from the coating composition (II), the decorative effect of the lamellar structures produced according to the invention. The plastic films also contribute towards the protective action of the laminar structures produced according to the invention, for example providing protection from damage by stone impact, in particular when thick plastic films are used.

The plastic films used in the process according to the invention may be non-transparent and cover the substrate completely opaquely, such that the decorative effect of a laminar structure produced according to the invention is determined solely by the plastic film. The plastic film may, for example, be coloured on the surface or consist of a through-coloured plastic. Through-coloured plastics contain an adequate quantity of pigments and plastic films produced therefrom are non-transparent. The plastic films may, however, also additionally be provided with an opaquely pigmented lacquer layer or an opaque print (for example as a pattern or representational image). Pigments which may be considered for through-colouring the plastic or for pigmenting the opaque lacquer layer are conventional inorganic and/or organic colouring and/or effect pigments, such as for example titanium dioxide, carbon black, iron oxide pigments, phthalocyanine pigments, quinacridone pigments, metal pigments, for example made from aluminium, interference pigments, such as for example aluminium coated with titanium dioxide, coated mica or lamellar copper phthalocyanine pigments. Preferably, only absorption pigments are present, i.e. the non-transparent plastic films are preferably plain coloured plastic films. The non-transparent plastic films may have additional lacquer layers and/or be printed (for example with a pattern or image).

Preferably, however, transparent plastic films which determine the decorative effect of the laminar structures produced according to the invention in conjunction with the coating layer produced from the electrocoating lacquer composition (II) are used in the process according to the invention.

The transparent plastic films may be colourless or transparently coloured, for example preferably with dyes soluble in the plastic. Colouring may also be provided, optionally also in addition to the use of soluble dyes, by a small, non-opaque quantity of colouring pigments or of sufficiently finely divided colouring pigments.

The transparent plastic films may also contain effect pigments.

The transparent plastic films may also be non-opaquely lacquer coated and/or printed (for example with a pattern or image). Lacquer coatings which may be considered are both clear lacquer layers and single or multi-layer transparent coloured and/or effect lacquer coatings.

The transparent or non-transparent plastic films used in the process according to the invention may have a structure, for example be embossed, but the plastic films preferably have a smooth, in particular glossy, surface.

The plastic films are preferably applied in the form of a set of films, i.e. they are preferably in the form of a number of plastic films cut to fit the individual visible surfaces of a three-dimensional substrate. The individual plastic films in a set may be of differing designs. In the event that the individual films are of differing designs, substrates may be provided with an overall appearance which is non-uniform with regard to the decorative effect. The individual plastic films of a set preferably have the same design.

The laminar structures are produced according to the invention by applying the plastic films onto the coating layers of the electrocoating lacquer composition (II) which have been deposited and stoved. Application preferably involves an adhesive bond, which may optionally be promoted by suitable measures, for example the action of heat and/or vacuum. Adhesive bonding may be achieved by using a hot-melt adhesive, aqueous dispersion adhesive or a solvent-based adhesive or the plastic films are self-adhesive plastic films provided with a pressure sensitive adhesive on their reverse side, which are applied after removal from a flat backing sheet. Especially where self-adhesive plastic films are used, it is particularly simple, if desired, to renew the outer layer of a laminar structure produced according to the invention by removing the old self-adhesive film and applying a new one. The original design may here be selected or the design may be changed by selecting a different plastic film.

The plastic films may be adhesively bonded not only in an industrial context, for example by an automotive manufacturer, but also in a trade context, for example in a motor vehicle workshop, or in a do-it-yourself context by the final consumer. Especially in the trade and do-it-yourself context, self-adhesive plastic films are preferably used, particularly preferably a set of self-adhesive plastic films, for example in the case of automotive vehicles with an appropriate number of plastic films cut to fit the individual visible surfaces of the vehicle bodywork.

The process according to the invention is particularly convenient for providing a surface finish on those three-dimensional substrates, for example automotive bodies or parts thereof, which are of a simple shape, i.e. which have smooth or curved surfaces without numerous corners, edges, beads and angles.

This invention also relates to the protective and decorative laminar structures applied using the process according to the invention onto the surface of three-dimensional substrates, the laminar structures consisting of a primer layer produced from a primer coating composition (Ia) or (Ib) or (Ic), a coating layer of an electrocoating lacquer composition (II) applied thereon and a plastic film adhesively bonded thereon.

The process according to the invention permits three-dimensional, electrically conductive substrates, in particular automotive bodies, to be provided with a protective and decorative laminar structure. Especially when transparent plastic films are used as the outer layer of the laminar structure produced according to the invention, numerous decorative variants may be produced. For example, it is possible to divide the substrates primed using the primer coating composition (Ia) or (Ib) or (Ic) into a number of groups corresponding to the number of electrocoating lacquer compositions (II) available with different coloured pigments. Each of the resultant groups of primed substrates may then be provided with a second coating layer of one of the differently pigmented electrocoating lacquer compositions (II). The number of electrocoating lacquer compositions (II) used in different shades is preferably limited. Different transparent plastic films may then be applied onto the substrates which have been provided with the second coating layer in one of a limited variety of shades. In this manner, it is possible to produce the various possible combinations of transparent plastic films with the available number of differently coloured precoated substrates.

The process according to the invention is logistically straightforward, it may be performed with a limited number of different coating compositions, spray application of coating compositions and thus the consequent formation of the waste typical of lacquer spraying are avoided. The process according to the invention permits the surface of three-dimensional substrates, in particular motor vehicles, to be provided with a protective coating and decorative finish. Consistent colouring or effects may thus be applied even to assemblies of different substrate components.

What is claimed is:

1. A process for finishing the surface of an automobile or a component thereof with a protective and decorative laminar finish consisting of:
    applying a primer layer of a coating composition which is electrically conductive in the stoved state, without spraying, onto an electrically conductive substrate and stoving said primer layer;
    electrophoretically depositing a second coating layer of an electrophoretically depositable coating composition on the primer layer and stoving said second coating layer; and
    bonding a thermoplastic film directly on the second coating layer using an adhesive to form a third coating layer of the protective and decorative laminar finish;
    wherein said themoplastic film, either alone or in conjunction with the second coating layer, determines the decorative effect of the laminar finish.

2. A process according to claim 1, wherein the conductive primer layer is applied by brushing, roller application, dipping or flow coating.

3. A process according to claim 1, wherein the conductive primer layer is applied using the coil coating process by autophoretic deposition or electrophoretic deposition.

4. The process of claim 1, wherein the adhesive is selected from the group consisting of a hot-melt adhesive, an aqueous dispersion adhesive, and a solvent-based adhesive.

5. The process of claim 1, wherein the thermoplastic film is self-adhesive.

6. The process of claim 1, wherein the thermoplastic film has a thickness of between 20 and 200 $\mu$m.

7. The process of claim 1, wherein the thermoplastic film is opaque.

8. The process of claim 1, wherein the thermoplastic film is transparent.

9. The process of claim 1, wherein the thermoplastic film is pigmented.

10. The process of claim 9, wherein the thermoplastic film is translucent.

11. A process for finishing the surface of an automobile or a component thereof with a protective and decoration laminar finish consisting of:
    applying a primer layer of a coating composition which is electrically conductive in the stoved state, without spraying, onto an electrically conductive substrate and stoving said primer layer;
    stamping or cutting the primed electrically conductive substrate to form an automobile or component thereof;
    shaping said automobile or component thereof three-dimensionally;
    electrophoretically depositing a second coating layer of an electrodepositable coating composition on the shaped automobile or component and stoving said second coating layer; and
    bonding a thermoplastic film directly on the second coating layer using an adhesive to form a third coating layer of the protective and decorative laminar finish;
    wherein said thermoplastic film, either alone or in conjunction with the second coating layer, determines the decorative effect of the laminar finish.

12. A process for finishing the surface of an automobile with a protective and decorative laminar finish consisting of:

applying a primer layer of a coating composition which is electrically conductive in the stoved state, without spraying, onto an electrically conductive substrate in the form of an automobile component and storing said primer layer;

assembling said automobile component having the applied primer layer;

electrophoretically depositing a second coating layer of an electrodepositable coating composition on the assembled automobile component and stoving said second coating layer; and bonding a thermoplastic film directly on the second coating layer using an adhesive to form a third coating layer of the protective and decorative laminar finish;

wherein said thermoplastic film, either alone or in conjunction with the second coating layer, determines the decorative effect of the laminar finish.

13. A process for finishing the surface of an automobile or a component thereof with a protective and decorative laminar finish consisting of:

applying a primer layer of a coating composition which is electrically conductive in the stoved state to an electrically conductive sheet metal coil by a coil coating process and stoving said primer layer;

stamping out sheet metal components from the sheet metal coil having the applied primer layer and shaping said metal components;

electrophoretically depositing a second coating layer of an electrodepositable coating composition on the shaped metal components and stoving said second coating layer; and bonding a thermoplastic film directly on the second coating layer using an adhesive to form a third coating layer of the protective and decorative laminar finish;

wherein said thermoplastic film, either alone or in conjunction with the second coating layer, determines the decorative effect of the laminar finish.

\* \* \* \* \*